US009128296B2

(12) United States Patent  
Steinborn et al.

(10) Patent No.: US 9,128,296 B2  
(45) Date of Patent: Sep. 8, 2015

(54) MICROSCOPE WITH RETAIN FOCUS CONTROL

(75) Inventors: Stefan Steinborn, Bovenden (DE); Eugen Wehner, Goettingen (DE); Reiner Mitzkus, Goettingen (DE); Gleb Milinovici, Goettingen (DE); Steffen Leidenbach, Reinhausen (DE); Peter Westphal, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 728 days.

(21) Appl. No.: 12/937,965

(22) PCT Filed: Apr. 4, 2009

(86) PCT No.: PCT/EP2009/002502  
§ 371 (c)(1),  
(2), (4) Date: Oct. 14, 2010

(87) PCT Pub. No.: WO2009/127336  
PCT Pub. Date: Oct. 22, 2009

(65) Prior Publication Data  
US 2011/0051232 A1 Mar. 3, 2011

(30) Foreign Application Priority Data  
Apr. 15, 2008 (DE) .......................... 10 2008 018 864

(51) Int. Cl.  
*G02B 27/64* (2006.01)  
*G02B 21/24* (2006.01)  
(Continued)

(52) U.S. Cl.  
CPC .............. *G02B 21/241* (2013.01); *G01B 11/22* (2013.01); *G01B 11/28* (2013.01); *G01B 11/285* (2013.01);  
(Continued)

(58) Field of Classification Search  
CPC ........ G03B 13/32; G03B 13/34; G03B 13/36; G06K 9/00127; G01B 11/22; G01B 11/28; G01B 11/285; G05B 11/10; G05B 11/125; G05B 11/06; G05B 11/12  
USPC ................. 250/201.3, 201.2, 201.4; 359/383; 396/432  
See application file for complete search history.

(56) References Cited

U.S. PATENT DOCUMENTS 5,790,710 A * 8/1998 Price et al. ..................... 382/255  
6,332,061 B1 * 12/2001 Arita .............................. 396/104  
(Continued)

FOREIGN PATENT DOCUMENTS

JP 2006-11149 1/2006  
WO WO 01/90796 A2 11/2001  
WO WO 2007/144197 A1 12/2007

*Primary Examiner* — Georgia Y Epps  
*Assistant Examiner* — Kevin Wyatt  
(74) *Attorney, Agent, or Firm* — Christensen Fonder P.A.

(57) ABSTRACT

A microscope including an imaging optical unit, a sample stage for supporting a sample to be examined, a movement unit, by which the distance between sample stage and imaging optical unit can be altered, a focus measuring unit, which measures the present focus position and outputs a focus measurement signal, a control unit for maintaining a predetermined focus position for examinations of the sample that are separated from one another in time. The control unit receives the focus measurement signal and derives a deviation of the present focus position from the predetermined focus position. Dependent on the deviation derived the movement unit, changes the distance between sample stage and imaging optical unit so that the predetermined focus position is maintained. The control unit drives the movement unit (9) for maintaining the predetermined focus position only before and/or after at least one of the examinations, but never during the examinations.

13 Claims, 3 Drawing Sheets

(51) Int. Cl.
| | |
|---|---|
| *G03B 13/34* | (2006.01) |
| *G01B 11/22* | (2006.01) |
| *G03B 13/32* | (2006.01) |
| *G01B 11/28* | (2006.01) |
| *G06K 9/00* | (2006.01) |
| *G05B 11/12* | (2006.01) |
| *G05B 11/06* | (2006.01) |
| *G05B 11/10* | (2006.01) |
| *G03B 13/36* | (2006.01) |
| *G02B 21/36* | (2006.01) |

(52) U.S. Cl.
CPC .............. *G02B 21/367* (2013.01); *G03B 13/32* (2013.01); *G03B 13/34* (2013.01); *G03B 13/36* (2013.01); *G05B 11/06* (2013.01); *G05B 11/10* (2013.01); *G05B 11/12* (2013.01); *G06K 9/00127* (2013.01)

(56) References Cited

U.S. PATENT DOCUMENTS

| | | | |
|---|---|---|---|
| 2005/0258335 | A1 | 11/2005 | Oshiro et al. |
| 2007/0122143 | A1* | 5/2007 | Okamoto ..................... 396/432 |
| 2008/0123185 | A1* | 5/2008 | Yoneyama et al. ........... 359/383 |
| 2010/0033811 | A1 | 2/2010 | Westphal et al. |

* cited by examiner

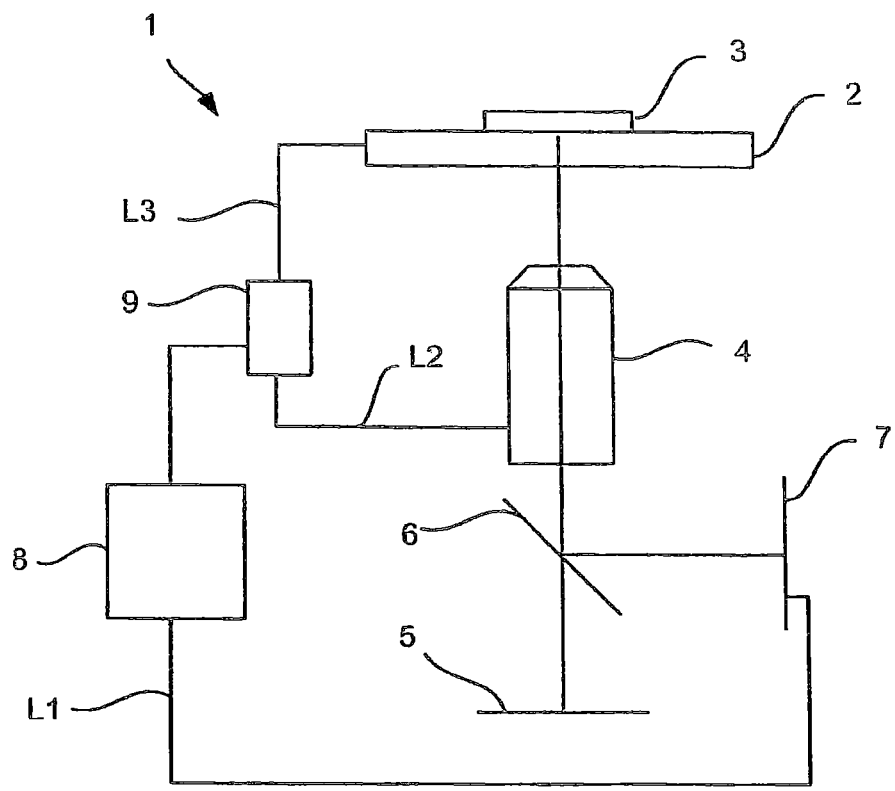
Fig. 1
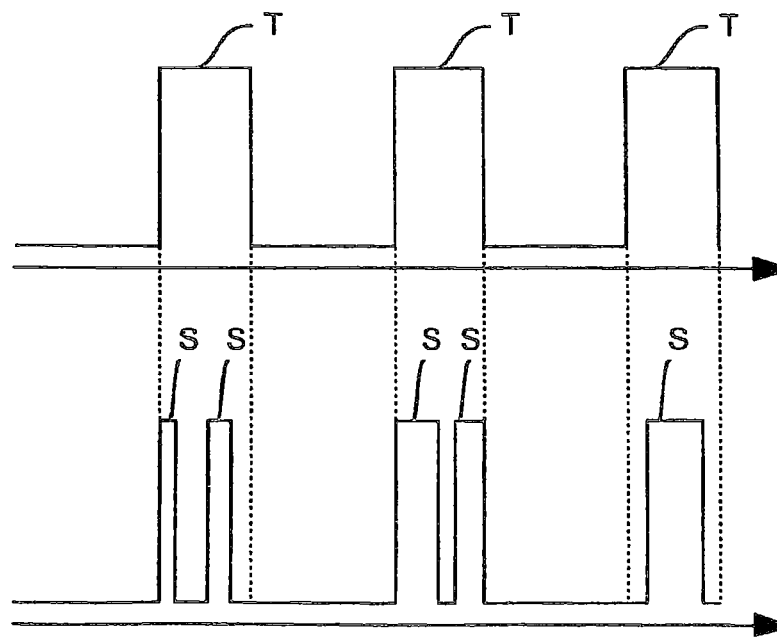
Fig. 2a
Fig. 2b

MICROSCOPE WITH RETAIN FOCUS CONTROL

PRIORITY CLAIM

The present application is a National Phase entry of PCT Application No. PCT/EP2009/002502, filed Apr. 4, 2009, which claims priority from German Application Number 102008018864.6, filed Apr. 15, 2008, the disclosures of which are hereby incorporated by reference herein in their entirety.

FIELD OF THE INVENTION

The invention relates to a microscope with imaging optics, a stage for supporting a sample to be examined, a motion unit for adjusting the distance between stage and imaging optics, a focus measurement unit which measures the actual focal position and emits a focus measurement signal, and a control unit for retaining a predetermined focal position for temporally spaced examinations of the sample, whereby the control unit thereto receives the focus measurement signal and derives there from a deviation between the actual focal position and the predetermined focal position, and depending on the derived deviation, changes the distance between the stage and the imaging optics by operation of the motion unit in such a way that the predetermined focal position is retained.

BACKGROUND

Such retention of the focal position is also often called a retaining focus control since the focal and/or imaging position is maintained for a long period of time. Said period of time can last for several hours or even days.

Such periods of time are, for example, necessary for experiments with live cells, when regulating the incubation or the ambient temperature is often critical and deviations from the focal position (i.e., drifts in the observational direction of the imaging optics) would disrupt or make impossible long-term time series experiments. Also, during microscopic applications, time series are frequently recorded, whereby a focus drift would naturally influence the experiment negatively.

Until now, if at all, the retaining focus adjustment is performed continuously in order to ensure retention of the desired focal position. However, disadvantageously this leads to great stress for the electromechanical components of the motion unit since many small movements are carried out during the retaining focus control.

SUMMARY OF THE INVENTION

Based on the aforementioned, the invention further develops a microscope of the initially described type in such a way that the stress on the motion unit can be decreased.

According to the invention, the task for a microscope of the initially described type is solved in such a way that the control unit effects the retention of the predetermined focal position only before and/or after at least one of the examinations but never during the examinations. As a result, the time lapse during which the motion unit is needed for maintaining the predetermined focal position, and therefore also the mechanical stress on the motion unit, can be decreased.

Therefore, with such a retaining focus control, the predetermined focal position is maintained or, in other words, the optical path length of the microscope image is kept constant.

The predetermined focal position does not have to be the best focal position. However, it is important that the set focal position, which was selected by the user of the microscope, is maintained permanently for the examinations.

With the microscope, according to the invention, the control unit can effect the retention of the predetermined focal position before and after at least one of the examinations.

Particularly, the control unit of the microscope, according to the invention, can effect the retention of the predetermined focal position only during temporally spaced control intervals. As a result, the temporal stress on the motion unit can be further decreased.

Furthermore, the desired examination can be performed between the control intervals and will not be affected negatively through movements of the imaging optics and/or the stage.

Particularly, said examinations can be the mapping of an image of the sample.

Particularly, the control intervals can be selected in such a way that several control intervals lay between two consecutive examinations. This ensures that the predetermined focal position is always present during the examination.

The temporal length of the control intervals and/or temporal distance of the control intervals can be predetermined.

However, it is also possible to determine the temporal distance of the interval, depending on the focus measurement signal, through the control unit. Said determination can take place dynamically; as a result, the optimum between minimal stress on the motion unit and optimal retention of the focal position can be achieved.

It is also possible to predetermine the temporal distance for at least two consecutive examinations. Said predetermination can also take place dynamically.

Moreover, the control unit of the microscope, according to the invention, can effect the retention of the predetermined focal position only immediately before the respective examination. Said type of retention of the predetermined focal position can be triggered by the examination itself. If the retention of the focal position is triggered by the examination itself, a request signal, for example, for performing an examination can be sent to the control unit. Based on said request signal, the control unit determines whether the predetermined focal position exists. If it exists, no change in distance for retention of the predetermined focal position is performed and the examination is cleared. For example, the control can emit an appropriate signal. If the predetermined focal position is not given, the control unit triggers the motion unit in such a way that the predetermined focal position is reached. Then the control unit interrupts the retention of the predetermined focal position and emits the clearance signal for performing the examination.

According to an example embodiment of the invention, the duration of the retention is shorter than the interval between two consecutive examinations. Alternatively, however, it can correspond with the interval. In such a case, the predetermined focal position is retained via the retaining focus control until the times of the examinations.

As a result, the mechanical stress on the motion unit can be minimized.

Advantageously, the control unit can thereby continuously determine the direction and, if applicable, the amount of deviation between the predetermined and actual focal position and utilize said determinations for the retention of the predetermined focal position effected immediately before the respective examination. As a result, it is easier to reach the predetermined focal position quickly.

Furthermore, the control unit can continuously determine the deviation between predetermined and actual focal position and effect the retention of the predetermined focal position in case a threshold value is exceeded.

According to the invention, the microscope can be designed in such a way that the threshold value is adjustable and/or can be entered. For example, it is possible that a user of the microscope enters the threshold value.

In addition, the microscope can adjust the threshold value automatically, depending on the imaging optics. If, e.g., a lens change takes place, the microscope can thereupon adjust the threshold value to the now modified imaging optics.

The microscope can be designed as a reflected light microscope or a transmitted light microscope. The microscope can be designed as a confocal microscope, as a laser-scanning microscope, and/or as a fluorescence microscope. Furthermore, the microscope can exhibit an illumination unit. The microscope can also comprise an input unit through which the microscope can be operated, and, particularly, different microscopy modes can be selected. The input unit can be designed, particularly, as a touch-activated screen.

The realization of the retaining focus control and/or adjustment and, particularly, the optical realization can be identical or similar to WO2007/144197 A1. The content of WO2007/144197 A1 is herewith incorporated herein by reference.

It is understood that the aforementioned as well as the following characteristics still to be described are applicable not only in the described combinations but also in other combinations or unique characteristics without departing from the framework of the invention described herein.

BRIEF DESCRIPTION OF THE DRAWINGS

In the following, the invention shall be further explained by way of examples through the attached drawings, which also disclose invention-essential characteristics. It is shown in:

FIG. 1 is a schematic view of a first embodiment of the microscope, according to the invention;

FIG. 2a is a diagram for exemplification of the control intervals;

FIG. 2b is a diagram for exemplification of the performed retaining focus control during the control intervals;

DETAILED DESCRIPTION

Figure 3A:
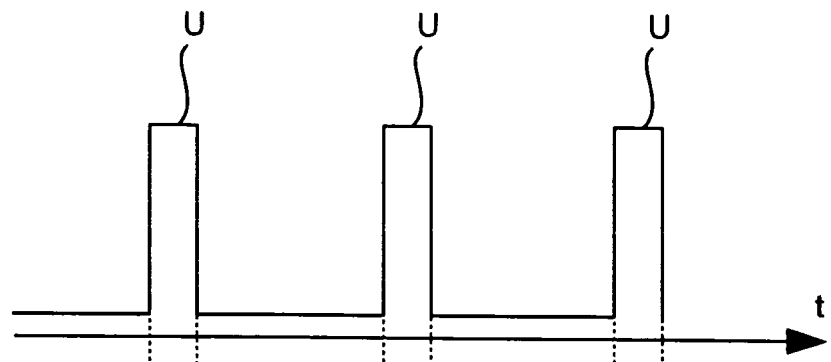
FIG. 3a is a diagram for exemplification of the examination intervals.

The embodiment in FIG. 1 comprises the microscope 1, according to the invention, which is, for example, designed as an inverted microscope, a stage 2 that holds a sample 3 to be examined, and imaging optics 4 which map the sample to be examined onto a detector (for example, a CCD detector) of a detector unit 5.

Furthermore, the microscope comprises a beam splitter 6 which allows the radiation for the mapping of sample 3 onto the detector of the detector unit 5 to pass almost unaltered and guides the focus measurement radiation (e.g., infrared radiation) onto the focus measurement unit 7. The focus measurement radiation is produced, e.g., with a radiation source (not shown), arranged in the area of the focus measurement unit, mapped via the mirror 6 and imaging optics 4 onto the sample 3, reflected from the sample 3 and directed via imaging optics 4 and the mirror 6, as already mentioned, onto the focus measurement unit 7. The focus measurement unit 7 can measure the actual focal position of the imaging optics 4 in the sample 3 and emit an appropriate focus measurement signal. The focus measurement signal is fed, as indicated through line L1, to a control unit 8.

Moreover, the microscope 1 contains a motion unit 9, with which the distance (in observational direction) between the imaging optics 4 and the stage 2, and therefore sample 3, can be altered. This is indicated through lines L2 and L3. The motion unit 9, generally, either moves only the imaging optics 4 or the stage 2. This simplifies the mechanical configuration.

The microscope 1, according to the invention, is designed in such a way that it is capable of retaining a set and/or predetermined focal position (position of the focal plane in the sample 3 to be examined) over a long period of time (for example, several hours or even several days). Since the focal and/or imaging position is maintained, this can also be referred to as a retaining focus functionality of the microscope 1, according to the invention. Together the focus measurement unit 7 and the control unit 8 form a retaining focus control unit.

The retaining focus functionality of the microscope in FIG. 1, according to the invention, is achieved through performing the adjustment of the focal position only during temporally spaced control intervals T, as shown schematically in FIG. 2. During the time lapse between two control intervals T, no retaining focus adjustment occurs, allowing for the desired sample examinations (such as image acquisition of sample 3) to be performed during said periods.

Particularly, types of examinations can be performed during which a focus variation and/or a change in distance between imaging optics 4 and sample 3 would interfere.

The depiction in FIG. 2b shows schematically (as control periods S) when the control unit 8 triggers the motion unit 9 during the control intervals T in order to maintain the predetermined focal position. Examinations of the sample 3 are possible during the control intervals T. Particularly, the microscope can be designed in such a way that the desired examination is possible only between the control intervals T but not during the control intervals T.

This type of retaining focus control allows, advantageously, for the motion unit 9 to not be in constant operation, hence the electromechanical components of the motion unit 9 are under less stress than before.

Particularly, it is possible to freely select the length of the time windows between the control intervals T. The user can either freely specify said length, or e.g., several time window lengths are displayed for selection by user. It is also possible to have a user of the microscope 1 determine the duration of the control intervals T (e.g., to be entered freely, or different selectable values are provided). Thereby, the bottom limit would be the quickest adjustment of the system.

Once said selection is made, it is therefore also apparent in the microscope 1, when no retaining focus control is performed. In said time windows the desired examinations can then be performed, such as the mapping of an image, which would only lead to satisfactory results when all components of the microscope are at rest.

The retaining focus functionality of the microscope, according to the invention, can be realized in such a way that the predetermined examination intervals U are used as starting points. For example, the examination intervals U can, as shown in FIG. 3a, occur periodically. For example, periodic image acquisitions can be performed in so-called time-lapse experiments. No retaining focus adjustment, according to the invention, occurs during the examination intervals U.

Figure 3B:
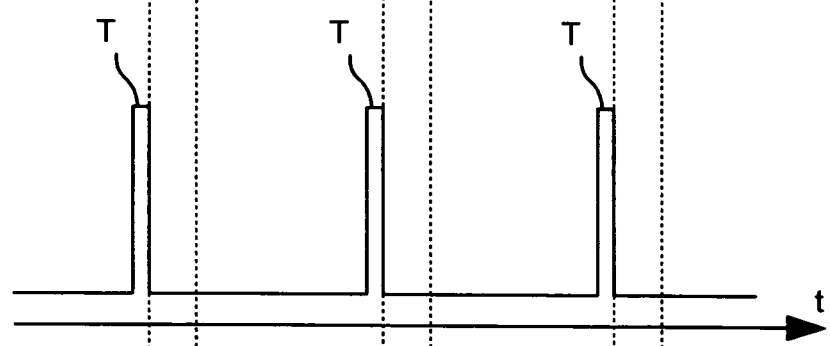
FIG. 3b is a diagram for exemplification of the control intervals.

In a first control mode, the examination, which is to be performed during the examination interval U, is prepared in such a way that a control interval T is effected prior to the examination interval U, whereby the retaining focus adjustment is activated and the predetermined focal position is adjusted (FIG. 3b). Thereby, the execution of the control interval T can be initiated, for example, through an external signal by the microscope user or, in the case of the aforementioned time-lapse experiments, through an appropriate request from the control program for execution of the time-lapse experiments. After completion of the control interval T, the execution of the examination interval U will be cleared. During the examination interval U, no additional retaining focus adjustment takes place, as can be seen, e.g., in FIGS. 3a and 3b. Therefore, in said control mode, a retaining focus adjustment always takes place immediately before the examination interval U.

Figure 3C:
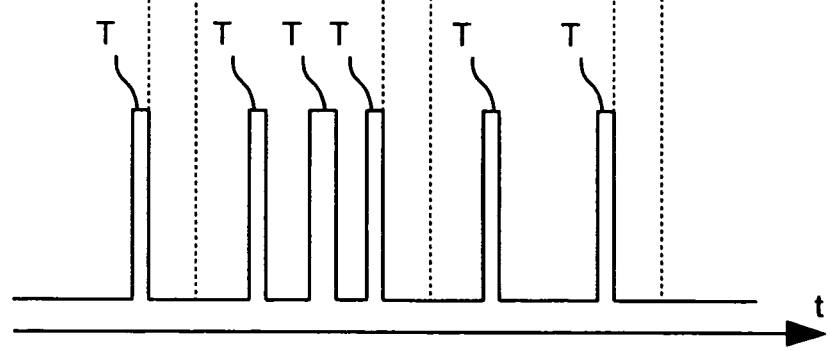
FIG. 3c is a diagram for exemplification of the control intervals.

Of course, it is also possible that additional control intervals T are effected between two examination intervals U, as is indicated, e.g., in FIG. 3c.

In each case, the retaining focus adjustment takes place at no time during the examination intervals U, whereby the stress on the motion unit 9 is decreased. Further relief for the motion unit 9 can be achieved, e.g., through setting the threshold value for the adjustment between the examination intervals U to the maximum of the detector 7. Now the adjustment is only effected when the system reaches the measuring limits of the detector 7 yet continues to remain at all times in a defined status.

The drift of the focal position of the microscope 1, to be compensated through the retaining focus control, frequently has various causes that can affect the focus drift in different ways. For example, the various causes might possibly compensate or amplify each other. Interferences during the examination, such as change in temperature of the sample and/or the imaging optics, can also lead to unforeseeable drifts of the focal position.

For such applications, the retaining focus control can be designed in such a way that the focus measurement unit 7 continuously measures the existing focal position and sends an appropriate focus measurement signal to the control unit 8. Once the control unit 8 determines that the deviation of the existing focal position from the predetermined focal position becomes so great that the existing focal position threatens to drift from the depth of field of the imaging optics 4, the control unit 8 triggers the motion unit 9 in such a way that the predetermined focal position is once again reached through a change of the distance between stage 2 and imaging optics 4. In this case, the retaining focus control will therefore be activated. Once the predetermined focal position is reached, the retaining focus control is deactivated and will only be reactivated when it is determined through the focus measurement signal that the focal position would drift from the depth of field of the imaging optics if no retaining focus adjustment were to be initiated.

Figure 4A:
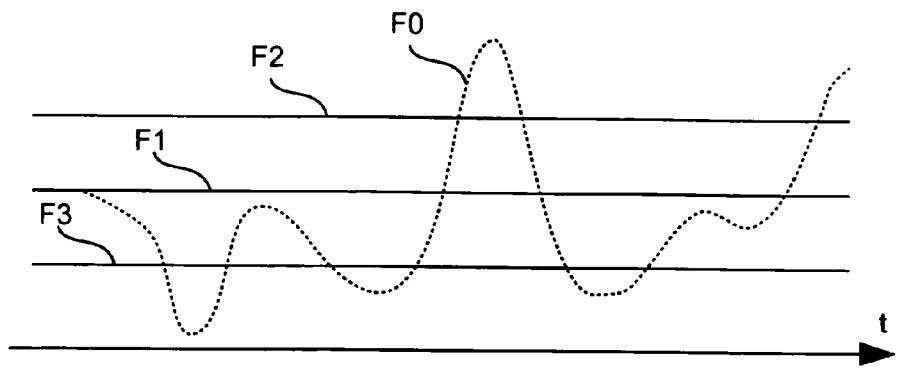
FIG. 4a is a depiction for exemplification of the temporally existing focus drift.

In order to illustrate such a control mode, FIG. 4a shows the temporal course (in dependence of time t) of the actual focal position F0 without retaining focus adjustment (dotted line). In this illustration, the predetermined focal position F1 is also delineated with the two boundaries F2, F3 of the depth of field of the imaging optics 4. As can be seen in FIG. 4a, the actual focal position F0 would drift repeatedly from the depth of field of the imaging optics 4.

Figure 4B:
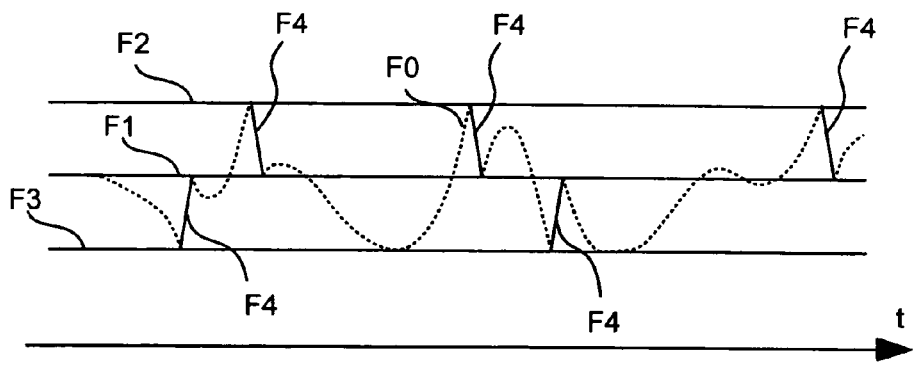
FIG. 4b is a depiction for exemplification of the dynamic retaining focus control.
Figure 4C:
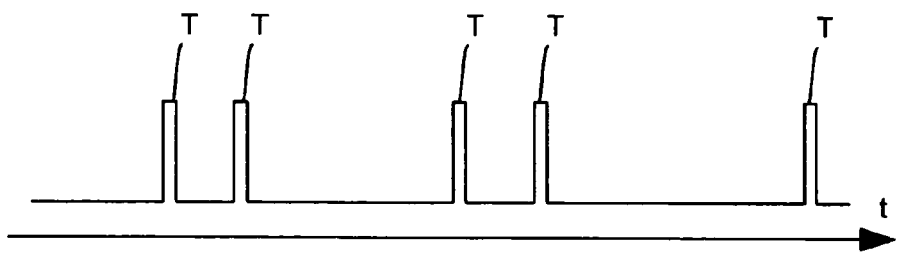
FIG. 4c is a depiction of the control intervals T.

When the dynamic retaining focus adjustment in the microscope 1, as described above, is switched on, the retaining focus adjustment will be activated every time a drift of the actual focal position from the depth of field is imminent. These control times are shown in FIG. 4b as solid line segments F4. As can be seen from the illustration in FIG. 4b, the actual focus is therefore always positioned within the desired depth of field of the imaging optics 4 (between F2 and F3; FIG. 4b). FIG. 4c shows the respective control intervals T. In the time windows between the control intervals T, the desired examinations, during which the microscope and its components, e.g., must be at rest, as is the case for the imaging of the sample 3, can now, in turn, be performed. Therefore, with the dynamic retaining focus adjustment, the actual focal position always lies within the desired depth of field of the imaging optics 4.

The focus depth for the imaging optics 4 can be calculated, as an example, in simplified form in accordance with the following formula:

$$d_s = n \cdot \lambda / NA^2.$$

Thereby, $d_s$ denotes the focus depth, NA the numerical aperture of the imaging optics 4, and $\lambda$ an average wavelength of the visible wavelength range, whereby herein 550 nm were assigned to $\lambda$. n is the refractive index of the immersion medium, whereby, for example, $n_{air}=1$, $n_{water}=1.328$, or $n_{glycerin}=1.477$.

If the user does not wish to utilize the entire depth of field of the imaging optics 4, the boundaries F2 and F3 can, of course, be selected to be narrower, reducing the area in which the actual focal position may vary.

The described dynamic retaining focus adjustment can be modified in such a way that the dynamic adjustment is performed over a predetermined period of time. If it is determined subsequently that the focal position can be held securely in the desired area with said adjustment, the ascertained control intervals T and distances of the control intervals T are used for the following retaining focus adjustment.

This procedure reduces the control effort.

If the mechanical stress on the motion unit 9 is to be minimized, the retaining focus adjustment can be designed in such a way that the adjustment is performed only directly before a desired examination.

If, e.g., an image acquisition is to take place at a predetermined point in time, a signal is sent to the control unit before execution of the image acquisition. Subsequently, the control unit 8 activates the retaining focus adjustment and, once the predetermined focal position is reached, sends a signal back to the detector unit 5 and terminates the retaining focus adjustment.

Due to the signal from the control unit, the detector unit 5 can now perform the required imaging. This approach can be disadvantageous in that it might become difficult to reach the predetermined focal position if the deviation at the beginning of the retaining focus adjustment is too great. In this case, it is advantageous if the focus measurement unit 7 continually measures the actual focal position and informs the control unit 8, so that the control unit 8 at least knows at the beginning of the retaining focus adjustment, in which direction the actual focal position deviates from the predetermined focal position at the moment.

Finally, it is also possible to design the retaining focus adjustment in such a way that it is not performed only during the desired examinations. In such case, the detector unit 5 needs to know that the retaining focus adjustment is interrupted. Therefore, the detector unit 5, at first, sends a signal for interrupting the retaining focus adjustment to the control unit 8. Once the control unit 8 has interrupted the retaining focus adjustment, it sends a confirmation signal to the detector unit 5, which subsequently performs the desired examination (such as an image acquisition). After conclusion of the examination, the detector unit 5 sends a signal to the control unit, which subsequently continues the retaining focus adjustment.

The invention claimed is:

1. A microscope, comprising:
   imaging optics;
   a stage that supports a sample to be examined during an examination interval;
   a motion unit operably coupled to either the stage or the imaging optics that adjusts a distance between the stage and the imaging optics;
   a focus measurement unit that measures an actual focal position and emits a focus measurement signal;
   a control unit operably coupled to the motion unit and the focus measurement unit that maintains a predetermined focal position for temporally spaced examinations of the sample;
   wherein the control unit receives the focus measurement signal and derives therefrom a derived deviation between the actual focal position and a predetermined focal position, and depending on the derived deviation, changes the distance between the stage and the imaging optics by operation of the motion unit such that that the predetermined focal position is substantially maintained;
   further wherein the control unit triggers the motion unit to maintain the predetermined focal position only before and/or after at least one of the examination intervals but never during the examination interval;
   further wherein the control unit continuously determines the deviation between the predetermined focal position and the actual focal position while the motion unit is at rest and is not adjusting the distance between the stage and the imaging optics, and wherein the control unit effects substantial maintenance of the predetermined focal position by causing the motion unit to adjust a distance between the stage and the imaging optics when the deviation between the predetermined and the actual focal position exceeds a threshold value; and
   further wherein the threshold value is adjusted automatically dependent upon the imaging optics.

2. The microscope, according to claim 1, wherein the control unit causes the substantial maintenance of the predetermined focal position before and after at least one of the examination intervals.

3. The microscope, according to claim 1, wherein the control unit causes the substantial maintenance of the predetermined focal position only during temporally spaced control intervals.

4. The microscope, according to claim 3, wherein the control intervals are selected such that several control intervals occur between two consecutive examinations.

5. The microscope, according to claim 3, wherein the temporal length of the control intervals and/or the temporal distance of the control intervals is predetermined.

6. The microscope, according to claim 3, wherein the control unit determines a temporal separation of the control intervals, dependent upon the focus measurement signal.

7. The microscope, according to claim 6, wherein the temporal separation is continuously determined dependent upon the focus measurement signal.

8. The microscope, according to claim 7, wherein the temporal separation for at least two consecutive examinations is predetermined.

9. The microscope, according to claim 1, wherein the control unit, after receiving a request signal for executing an examination, causes the adjustment of the predetermined focal position and subsequently clears the execution of the examination.

10. The microscope, according to claim 9, wherein the control unit continuously determines the direction and the amount of deviation between the predetermined and the actual focal position and utilizes said determination for the substantial maintenance of the predetermined focal position, effected immediately before the respective examination interval.

11. A focus-retaining microscope for retaining a predetermined focal position, comprising:
    imaging optics;
    a stage that supports a sample to be examined during an examination interval;
    a motion unit operably coupled to either the stage or the imaging optics that adjusts a distance between the stage and the imaging optics; and
    a control unit operably coupled to the motion unit, the control unit selectively controlling the motion unit so as to selectively maintain the predetermined focal position for temporally spaced examinations of the sample;
    wherein the microscope is configured to continuously measure an actual focal position and to continuously derive a deviation between the actual focal position and the predetermined focal position, and when the deviation between the predetermined and the actual focal position exceeds a threshold value, the motion unit causes the distance between the stage and the imaging optics to be adjusted such that the actual focus position is the predetermined focal position, thereby minimizing operation of the motion unit and stress on the electromechanical components of the motion unit; and
    wherein the threshold value is selected such that the actual focal position may drift from the predetermined focal position, but always lies within a depth of field of imaging optics of the microscope.

12. The focus-retaining microscope of claim 11, wherein the predetermined focal position is selected by a user of the microscope.

13. The focus-retaining microscope of claim 11, further comprising a focus measurement unit that measures the actual focal position and emits a focus measurement signal that is received by the control unit.

* * * * *

UNITED STATES PATENT AND TRADEMARK OFFICE
CERTIFICATE OF CORRECTION

PATENT NO.         : 9,128,296 B2                                Page 1 of 1
APPLICATION NO.    : 12/937965
DATED              : September 8, 2015
INVENTOR(S)        : Steinborn et al.

It is certified that error appears in the above-identified patent and that said Letters Patent is hereby corrected as shown below:

On Title Page, Column 1, Item (51), under "Int. Cl.",
      *G02B 27/64*    (2006.01)
delete "*G02B 21/24*    (2006.01)" and
insert -- *G02B 27/64*    (2006.01) --, therefor.

On Title Page, Column 2, Item (57), under "ABSTRACT", Line 14, delete "(9)".

On Page 2, Column 1, Item (51), under "Int. Cl.",
      *G03B 13/34*    (2006.01)
      *G01B 11/22*    (2006.01)
      *G03B 13/32*    (2006.01)
      *G01B 11/28*    (2006.01)
      *G06K 9/00*    (2006.01)
      *G05B 11/12*    (2006.01)
      *G05B 11/06*    (2006.01)
      *G05B 11/10*    (2006.01)
      *G03B 13/36*    (2006.01)
delete "*G02B 21/36*    (2006.01)".

On Page 2, Column 2, Item (52), under "U.S. Cl.", insert -- USPC..... 250/201.3 -- after CPC Class.

IN THE CLAIMS

In Column 7, Claim 1, Line 25, delete "such that that" and insert -- such that --, therefor.

Signed and Sealed this
Twenty-ninth Day of March, 2016

Michelle K. Lee
*Director of the United States Patent and Trademark Office*